United States Patent [19]
Chen

[11] Patent Number: 6,136,421
[45] Date of Patent: Oct. 24, 2000

[54] MAGNETO-RESISTANCE RECORDING MEDIA COMPRISING MULTILAYERED PROTECTIVE OVERCOATS

[75] Inventor: Ga-Lane Chen, Fremont, Calif.

[73] Assignee: Seagate Technology LLC, Scotts Valley, Calif.

[21] Appl. No.: 09/176,892

[22] Filed: Oct. 22, 1998

Related U.S. Application Data

[60] Provisional application No. 60/093,737, Jul. 21, 1998.

[51] Int. Cl.[7] .................................................. G11B 5/72
[52] U.S. Cl. .................. 428/216; 428/408; 428/694 TC; 428/900; 427/122; 427/131; 427/577; 204/192.16
[58] Field of Search ..................................... 428/216, 408, 428/694 TC, 900; 427/122, 131, 577; 204/192.16

[56] References Cited

U.S. PATENT DOCUMENTS

| | | | |
|---|---|---|---|
| 4,701,374 | 10/1987 | Sagoi et al. | 428/336 |
| 5,227,211 | 7/1993 | Eltoukhy et al. | 428/64 |
| 5,589,263 | 12/1996 | Ueda et al. | 428/336 |
| 5,637,393 | 6/1997 | Ueda et al. | 428/332 |
| 5,679,431 | 10/1997 | Chen et al. | 428/65.3 |

*Primary Examiner*—Stevan A. Resan

[57] ABSTRACT

A magnetic recording medium is provided with dual protective overcoats for excellent tribological properties at very low glide heights and long term durability. Embodiments include magnetic recording media comprising a dual protective overcoat system containing a silicon nitride oxide layer on a magnetic layer and a carbon-containing layer, such as amorphous hydrogenated carbon, amorphous nitrogenated carbon, or amorphous hydrogen-nitrogenated carbon on the silicon nitride layer oxide.

17 Claims, 1 Drawing Sheet

MAGNETO-RESISTANCE RECORDING MEDIA COMPRISING MULTILAYERED PROTECTIVE OVERCOATS

RELATED APPLICATION

This application claims priority from provisional patent application Ser. No. 60/093,737 filed Jul. 21, 1998, entitled "HYBRID OVERCOAT FOR MAGNETO-RESISTANCE RECORDING MEDIA," the entire disclosure of which is hereby incorporated by reference herein.

TECHNICAL FIELD

The present invention relates to magnetic recording media, particularly rotatable magnetoresistance (MR) or giant magnetoresistance (GMR) recording media, such as thin film magnetic disks cooperating with a magnetic transducer head. The present invention has particular applicability to high areal recording density magnetic recording media designed for drive programs having reduced flying height, or pseudo-contact/proximity recording.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

Conventional longitudinal recording media typically comprise a substrate, such as aluminum (Al) or an Al alloy, e.g., aluminum-magnesium (Al—Mg)-alloy, plated with a layer of amorphous nickel-phosphorus (NiP). Alternative substrates include glass, ceramic, glass-ceramic, and polymeric materials and graphite. The substrate typically contains sequentially deposited on each side thereof at least one underlayer, such as chromium (Cr) or a Cr-alloy, e.g., chromium vanadium (CrV), a cobalt (Co)-base alloy magnetic layer, a protective overcoat typically containing carbon, and a lubricant. The underlayer, magnetic layer and protective overcoat, are typically sputter deposited in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms. The lubricant is typically dissolved in an organic solvent, applied and bonded to the carbon overcoat of the magnetic recording medium by techniques such as dipping, buffing, thermal treatment, ultraviolet (UV) irradiation and soaking. A significant factor in the performance of a lubricant topcoat is the bonded lube ratio which is the ratio of the amount of lubricant bonded directly to the carbon overcoat of the magnetic recording medium to the amount of lubricant bonded to itself or to a mobile lubricant. Desirably, the bonded lube ratio should be between 0.3 to 0.7 (e.g. about 0.5 (50%)) to realize a meaningful improvement in stiction and wear performance of the resulting magnetic recording medium.

The escalating requirements for high areal recording density impose increasingly greater requirements on thin film magnetic recording media in terms of coercivity, stiction, squareness, medium noise and narrow track recording performance. In addition, increasingly high areal recording density and large-capacity magnetic disks require smaller flying heights, i.e., the distance by which the head floats above the surface of the disk in the CSS drive (head-disk interface). For conventional media design, a decrease in the head to media spacing increases stiction and drive crash, thereby imposing an indispensable role on the carbon-protective overcoat.

There are various types of carbon, some of which have been employed for a protective overcoat in manufacturing a magnetic recording medium. Such types of carbon include hydrogenated carbon, graphitic carbon or graphite, and nitrogenated carbon or carbon nitride and hydrogen-nitrogenated carbon. These types of carbon are well known in the art and, hence, not set forth herein in great detail.

Generally, hydrogenated carbon or amorphous hydrogenated carbon has a hydrogen concentration of about 5 at. % to about 40 at. %, typically about 20 at. % to about 30 at. %. Hydrogenated carbon has a lower conductivity due to the elimination of the carbon band-gap states by hydrogen. Hydrogenated carbon also provides effective corrosion protection to an underlying magnetic layer. Amorphous carbon nitride, sometimes referred to as nitrogenated carbon, generally has a nitrogen to hydrogen concentration ratio of about 5:20 to about 30:0. Hydrogen-nitrogenated carbon generally has a hydrogen to nitrogen concentration ratio of about 30:10 to 20:10 (higher concentration of hydrogen than nitrogen). Amorphous (a) hydrogen-nitrogenated carbon can be represented by the formula a-$CH_xN_y$, wherein "x" is about 0.05 (5.0 at. %: to about 0.20 (20 at. %), such as about 0.1 (10 at. %) to about 0.2 (20 at. %), and "y" about 0.03 (3.0 at. %) to about 0.30 (30 at. %), such as about 0.03 (3.0 at. %) to about 0.07 (7.0 at. %). A particularly suitable composition is a-$CH_{0.15}N_{0.05}$. Graphitic carbon or graphite contains substantially no hydrogen and nitrogen.

The drive for high areal recording density and, consequently, reduced flying heights, challenges the capabilities of conventional manufacturing practices. For example, a suitable protective overcoat must be capable of preventing corrosion of the underlying magnetic layer, which is an electrochemical phenomenon dependent upon factors such as environmental conditions, e.g., humidity and temperature. In addition, a suitable protective overcoat must prevent migration of ions from underlying layers into the lubricant topcoat and to the surface of the magnetic recording medium forming defects such as asperities. A protective overcoat must also exhibit the requisite surface for wear resistance, lower stiction, and some polarity to enable bonding thereto of a lubricant topcoat in an adequate thickness.

Furthermore, as the head disk interface decreases to less than about 1 μinch, it is necessary to reduce the thickness of the carbon-containing protective overcoat to below about 100 Å. However, when the thickness of the carbon-containing protective overcoat is reduced to below about 100 Å, head crash is encountered. Most GMR and MR media overcoats comprise a single layer of carbon material, such as amorphous hydrogenated carbon or amorphous nitrogenated carbon and exhibit adequate reliability at a thickness of about 125 Å to about 250 Å. However, as the thickness of the carbon-containing overcoat is reduced to below about 100 Å, head crash occurs, presumably because of lower wear resistance and the discontinuities formed in the sputter deposited layer.

Accordingly, there exists a need for a magnetic recording medium comprising a protective overcoat capable of satisfying the imposing demands for high areal recording density and reduced head disk interface. There also exists a particular need for an MR or a GMR magnetic recording medium having a protective overcoat with a thickness of less than about 100 Å with excellent tribological properties at very low glide heights and long term durability.

DISCLOSURE OF THE INVENTION

An advantage of the present invention is an effective MR or GMR magnetic recording medium comprising a protective overcoat having a thickness less than about 100 Å and exhibiting excellent tribological properties at very low glide heights and long term durability.

Another advantage of the present invention is a method of manufacturing a high areal recording density magnetic recording medium comprising a protective overcoat having a thickness less than about 100 Å and exhibiting excellent tribological properties at very low glide heights and long term durability.

Additional advantages and other features of the present invention will be set forth in part in the description which follows and in part will become apparent to those having ordinary skill in the art upon examination of he following disclosure or may be learned from the practice of the present invention. The advantages of the present invention may be realized and obtained as particularly pointed out in the appended claims.

According to the present invention, the foregoing and other advantages are achieved in part by a magnetic recording medium comprising: a silicon nitride oxide overcoat; and a hydrogenated carbon or nitrogenated carbon overcoat formed on the silicon nitride oxide overcoat. The silicon nitride oxide can be represented by the formula $Si_xN_yO_z$, wherein "x" is about 0.4 (40 at. %) to about 0.8 (80 at. %), e.g., about 0.45 (45 at. %) to about 0.7 (70 at. %), "y" is about 0.1 (10 at. %) to about 0.7 (70 at. %), e.g., about 0.2 (20 at. %) to about 0.5 (50 at. %), and "z" is about 0 to about 0.2 (20 at. %), e.g., about 0 to about 0.10 (10 at. %).

Another aspect of the present invention is a method of manufacturing a magnetic recording medium, the method comprising: depositing a silicon nitride oxide $Si_xN_yO_z$ overcoat on a magnetic layer; and depositing a hydrogenated carbon or nitrogenated carbon overcoat on the $Si_xN_yO_z$ overcoat.

Additional advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

Figure 1:
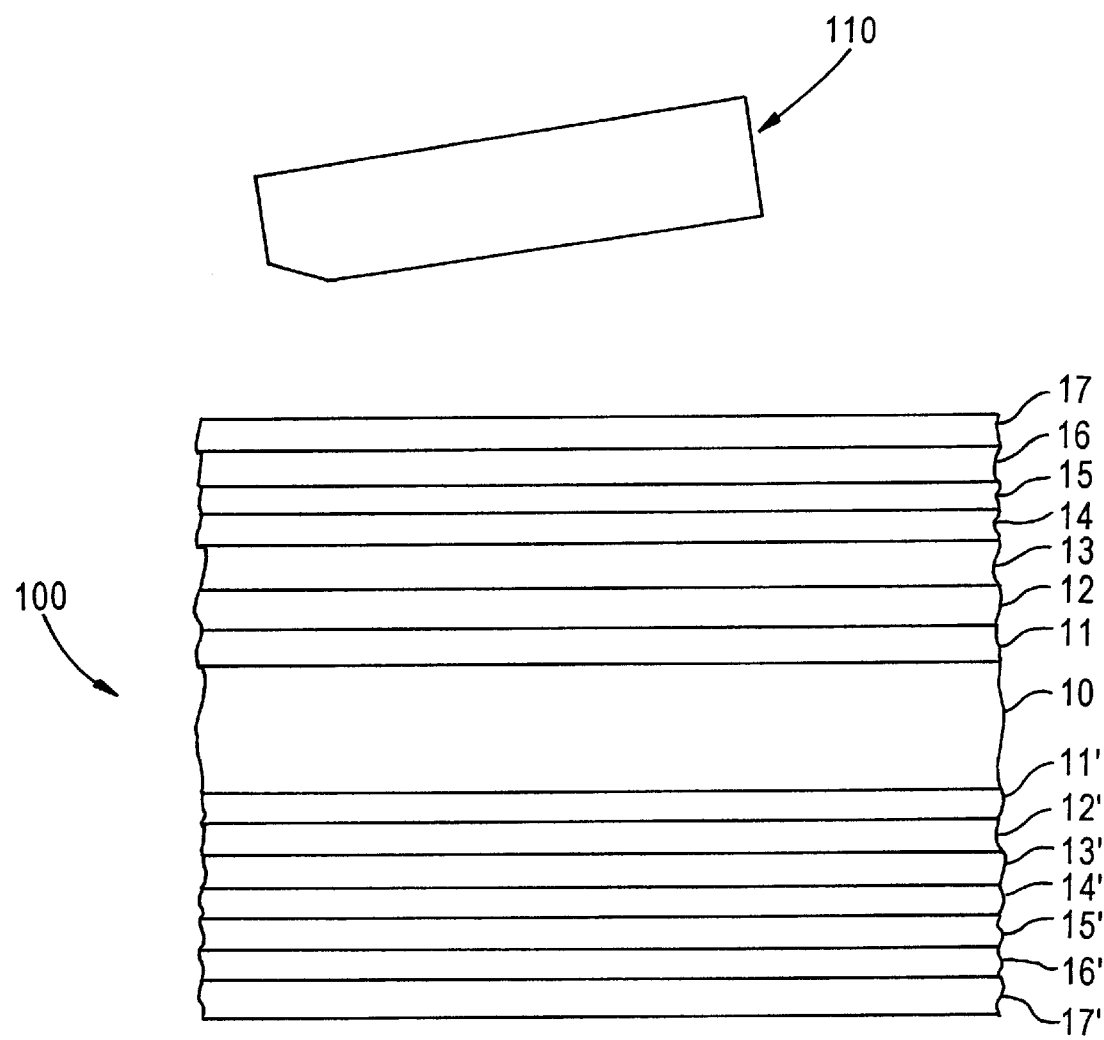
FIG. 1 schematically illustrates a magnetic recording medium in accordance with an embodiment of the present invention.

The present invention enables the manufacture of MR and GMR magnetic recording media containing a protective overcoat having a thickness less than about 100 Å, and further exhibiting excellent tribological properties at a very low glide height, e.g., below about 1 μinch and long term durability. Embodiments of the present invention comprise forming a composite protective overcoat comprising a first protective layer of $Si_xN_yO_z$ on a magnetic layer and a second protective layer on the $Si_xN_yO_z$ layer. Further embodiments of the present invention comprise depositing a layer of hydrogenated carbon (amorphous) or nitrogenated carbon (amorphous) on the $Si_xN_yO_z$ layer, as by reactive sputtering or chemical vapor deposition (CVD), or ion beam deposition.

The $Si_xN_yO_z$ layer employed in the present invention can have a composition which ranges from silicon-rich to nitrogen-rich with respect to stoichiometric $Si_3N_4$. The composition of the $Si_xN_yO_z$ overcoat is controlled by varying the ratio of the flow rates of nitrogen to argon during reactive sputtering by using silicon as the sputter target. The minor amount of oxygen in the deposited $Si_xN_yO_z$ is due to the presence of a surface oxide on the silicon target and a small amount of water vapor in the vacuum chamber. The composite protective overcoat of the present invention also prevents corrosion of the underlying magnetic layer, prevents migration of ions from underlying layers, enables adequate bonding of a lubricant topcoat thereto at a desirable thickness, such as about 5 Å to about 10 Å.

Embodiments of the present invention include sputter depositing a first protective overcoat of $Si_xN_yO_z$ on a magnetic layer at a thickness of about 25 Å to about 50 Å, and depositing a layer of amorphous hydrogenated carbon or a layer of amorphous nitrogenated carbon at a thickness of about 25 Å to 50 Å. For example, the $Si_xN_yO_z$ overcoat can be deposited at a thickness of about 25 Å, while the amorphous hydrogenated carbon or amorphous nitrogenated carbon overcoat can be deposited at a thickness of about 25 Å to 50 Å for a total thickness less than about 75 Å.

The exact operative mechanism which enables the formation of a uniform, continuous protective overcoat, at a thickness of less than about 100 Å, which avoids head crash is not known with certainty. However, it is believed that the initially deposited $Si_xN_yO_z$ layer provides the formation of a layer of a carbon-containing protective overcoat having a uniform thickness without discontinuities or voids, thereby enabling excellent tribological properties at a very low glide height, e.g., less than about 1 μinch, with long term durability.

Embodiments of the present invention comprise sputter depositing the $Si_xN_yO_z$ protective layer on a magnetic layer at a flow rate ratio of nitrogen to argon of about 0 to about 1.25. It has been found effective to employ a flow rate ratio of nitrogen to argon of about 0 to about 1.25 when depositing a protective overcoat of hydrogenated carbon on the silicon nitride oxide overcoat. It has also been found effective to employ a flow rate ratio of nitrogen to argon of about 0 to about 1.25 when depositing a protective overcoat of nitrogenated carbon on the $Si_xN_yO_z$ overcoat.

Embodiments of the present invention, therefore, comprise magnetic recording media having a composite protective overcoat comprising silicon nitride having a composition which ranges from stoichiometry to nitrogen-rich with a hydrogenated carbon overcoat thereon, and magnetic recording media having a composite protective overcoat comprising a $Si_xN_yO_z$ protective overcoat having a composition ranging from silicon-rich to stoichiometry with a nitrogenated carbon overcoat thereon.

Magnetic recording media in accordance with the present invention can comprise any conventional substrate, such as NiP/Al or an NiP/Al alloy substrate, Al or an Al alloy substrate, or a glass, ceramic, glass-ceramic or polymeric substrate. The present invention can be implemented employing any of the various conventional seedlayers, underlayers and magnetic layers and lubricant topcoats employed in manufacturing conventional magnetic recording media. For example, embodiments of the present invention comprise the use of a Cr or Cr alloy underlayer or underlayers, Co-alloy magnetic layers and perfluoro polyether lubricants for enhance durability.

An embodiment of the present invention is schematically illustrated in FIG. 1 and comprises an MR or a GMR medium 100 and slider 110. The medium comprises a substrate 10 having sequentially deposited on each side thereof a first seedlayer 11, e.g., NiP, and an NiAl seedlayer 12, 12' thereon. An underlayer 13, 13', e.g. CrMo is deposited on seedlayer 14, 14' and a magnetic layer 15, 15' is deposited on the underlayer 13, 13', e.g. a cobalt-chromium-platinum-tantalum (CoCrPtTa) alloy layer.

In accordance with the present invention a first protective overcoat 15, 15' comprising a first protective layer of $Si_xN_yO_z$ oxide is sputter deposited on magnetic layer 14, 14', and a second protective layer 16, 16' is deposited on the $Si_xN_yO_z$ protective overcoat 15, 15', such as amorphous hydrogenated carbon or amorphous nitrogenated carbon. Advantageously, in accordance with the present invention, the composite thickness of layers 15, 16 or 15', 16', is less than 100 Å, e.g. less than 75 Å. A lubricant topcoat 17, 17' is then formed on the composite overcoat.

EXAMPLES

Two groups of three disks were fabricated employing NiP/Al substrates. The first group of three disks comprised an NiAl seedlayer on the substrate, a CrMO underlayer on the seedlayer, a CoCrPtTa magnetic layer on the underlayer and a carbon (hydrogenated or nitrogenated) carbon overcoat having a thickness of 46 Å on the magnetic layer. Each of the three disks was provided with a lubricant topcoat having a thickness of about 25 Å, 26 Å and 27 Å, respectively. Each of the first group of disks crashed within the first 500 cycles of a CSS test. The disk with the lubricant topcoat of 27 Å crashed in 190 cycles; the disk with a lubricant topcoat of 26 Å crashed in 320 cycles; and the disk with the lubricant thickness 25 Å crashed in 466 cycles.

A second group of three disks was fabricated substantially corresponded to the first group of disks except for the deposition of a $Si_xN_yO_z$ protective overcoat layer of about 25 Å between the magnetic layer and carbon overcoat. Each of these disks successfully passed twenty thousands of CSS testing without any failure. The first disk, having a lubricant thickness of 27 Å, a carbon overcoat thickness of 46 Å and a $Si_xN_yO_z$ foundation layer thickness of 25 Å, successfully passed twenty thousand cycles of CSS testing with an overall parking stiction at 2.1 grams. The second disk, having a lubricant thickness of 26 Å, a carbon overcoat thickness of 46 Å and a $Si_xN_yO_z$ foundation layer thickness of 25 Å, successfully passed twenty thousand cycles of CSS testing with an overall parking stiction at 1.5 grams. The third disk, having a lubricant thickness of 25 Å, a carbon overcoat thickness of 46 Å and a $Si_xN_yO_z$ foundation layer at a thickness of 25 Å, also successfully passed twenty thousand cycles of CSS testing with an overall parking stiction at 1.2 grams.

The composition of the $Si_xN_yO_z$ layers are sputter deposited set forth in Table I below, which indicates the sputter gas flow rate ratio and the sputter film composition in at. %. The minor amount of oxygen stems from the surface oxide on the silicon sputtering target, while the minor amount of argon is sputter induced into the film.

TABLE I

| Sputter Gas Flow Rate Ratio | | Sputter Film Composition (atomic %) | | | |
| --- | --- | --- | --- | --- | --- |
| $N_2$ flow | Ar flow | N | O | Si | Ar |
| 100 | 80 | 46 | 7.1 | 45 | 2.2 |
| 86 | 80 | 46 | 6.2 | 46 | 2.0 |
| 40 | 80 | 46 | 6.0 | 52 | 2.8 |
| 20 | 80 | 23 | 4.6 | 68 | 3.7 |
| 0 | 80 | — | 43 | 51 | 5.6 |

The present invention provides magnetic recording media having a protective carbon overcoat at a thickness significantly less than 100 Å, e.g. less than 50 Å, for MR and MRG recording without encountering head crash, by providing a $Si_xN_yO_z$ foundation layer, at a thickness of about 25 Å to about 50 Å, under the carbon overcoat. Magnetic recording media in accordance with the present invention exhibit excellent tribological properties at very low glide heights, e.g. less than about 1 μinch, with long term durability.

The present invention can be advantageously employed to produce any of various types of magnetic recording media, including thin film disks. The present invention is particularly applicable in producing high areal recording density magnetic recording media requiring a low flying height.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A magnetic recording medium having a composite protective overcoat with a thickness less than about 100 Å and comprising a silicon nitride oxide ($Si_xN_yO_z$) overcoat and a carbon-containing overcoat formed on the $Si_xN_yO_z$ overcoat wherein: "x" is about 0.4 to about 0.8, "y" is about 0.1 to about 0.7, and "z" is up to about 0.2, and the carbon-containing overcoat comprises hydrogenated carbon (a-CH), nitrogenated carbon (a-CN) or hydrogen-nitrogenated carbon (a-$CH_aN_b$), wherein "a" is about 0.05 to about 0.20 and "b" is about 0.03 to about 0.30.

2. A magnetic recording medium according to claim 1, wherein the composite protective overcoat has a thickness less than about 75 Å.

3. The magnetic recording medium according to claim 1, wherein:
   the $Si_xN_yO_z$ overcoat has a thickness of about 25 Å to about 50 Å; and
   the a-CH, a-CN or a-$CH_aN_b$ overcoat has a thickness of about 25 Å to about 50 Å.

4. The magnetic recording medium according to claim 1, further comprising a lubricant topcoat on the a-CH, a-CN or a-$CH_aN_b$ overcoat.

5. The magnetic recording medium according to claim 1, comprising:
   a non-magnetic substrate;
   at least one underlayer;
   the magnetic layer on the underlayer; and
   a lubricant topcoat on the a-CH, a-CN or a-$CH_aN_b$ overcoat.

6. The magnetic recording medium according to claim 5, further comprising a seedlayer on the substrate and at least one underlayer on the seedlayer.

7. The magnetic recording medium according to claim 6, wherein;
   the substrate comprises nickel-phosphorous coated aluminum;
   the seedlayer comprises nickel-aluminum;
   the underlayer comprises chromium-molybdenum; and
   the magnetic layer comprises a cobalt-chromium-platinum-tantalum alloy.

8. The magnetic recording medium according to claim 6, wherein the substrate comprises aluminum or an aluminum alloy, nickel phosphorous coated aluminum or an aluminum alloy, or a glass, ceramic, glass-ceramic or polymeric material.

9. The magnetic recording medium according to claim 1, wherein the $Si_xN_yO_z$ composition ranges from silicon-rich to nitrogen-rich with respect to stoichiometry.

10. The magnetic recording medium according to claim 1, wherein the carbon-containing overcoat comprises hydrogenated carbon and the $Si_xN_yO_z$ composition ranges from stoichiometry to nitrogen-rich.

11. The magnetic recording medium according to claim 1, wherein the carbon-containing overcoat comprises a-CN and the $Si_xN_yO_z$ composition ranges from silicon-rich to stoichiometry.

12. A method of manufacturing a longitudinal magnetic recording medium, the method comprising:
    depositing a silicon nitride oxide ($Si_xN_yO_z$) overcoat on a magnetic layer, wherein "x" is about 0.4 to about 0.8, "y" is about 0.1 to about 0.7 and "z" is up to about 0.2; and
    depositing a hydrogenated carbon (a-CH), or nitrogenated carbon overcoat on the $Si_xN_yO_z$ overcoat to form a protective composite overcoat having a thickness less than about 100 Å.

13. The method according to claim 12, comprising sputter depositing the $Si_xN_yO_z$ overcoat at a flow rate ratio of nitrogen to argon of about 0 to about 1.25.

14. The method according to claim 13, comprising:
    sputter depositing the $Si_xN_yO_z$ overcoat at a flow rate ratio of nitrogen to argon of about 0 to about 1.25; and
    depositing a hydrogenated carbon (a-CH) overcoat on the $Si_xN_yO_z$ overcoat.

15. The method according to claim 13, comprising:
    sputter depositing the $Si_xN_yO_z$ overcoat at a flow rate ratio of nitrogen to argon of about 0 to about 1.25; and
    sputter depositing a nitrogenated carbon (a-CN) overcoat on the silicon nitride overcoat.

16. The method according to claim 12, comprising depositing the a-CH overcoat or a-CN overcoat by reactive sputtering or chemical vapor deposition.

17. The method according to claim 12, wherein the composite protective overcoat has a thickness less than about 75 Å.

* * * * *